United States Patent [19]
Kishimoto

[11] Patent Number: 5,664,572
[45] Date of Patent: Sep. 9, 1997

[54] METHOD FOR DISCRIMINATING SPECKLE NOISES FROM SIGNALS IN ULTRASONIC TOMOGRAPHY APPARATUS AND ULTRASONIC TOMOGRAPHY APPARATUS INCLUDING SPECKLE NOISE REMOVING CIRCUIT

[75] Inventor: Shinji Kishimoto, Ibaraki-ken, Japan

[73] Assignee: Hitachi Medical Corp., Tokyo, Japan

[21] Appl. No.: 721,715

[22] Filed: Sep. 27, 1996

[30] Foreign Application Priority Data

Sep. 29, 1995 [JP] Japan ..................................... 7-275107

[51] Int. Cl.⁶ ...................................................... A61B 8/00
[52] U.S. Cl. ...................................................... 128/660.07
[58] Field of Search ........................ 128/660.04, 660.06, 128/660.07, 661.01, 661.09, 662.02

[56] References Cited

U.S. PATENT DOCUMENTS 5,477,858 12/1995 Norris et al. ................. 128/661.09
5,479,926 1/1996 Ustuner et al. ................ 128/660.04

*Primary Examiner*—George Manuel
*Attorney, Agent, or Firm*—Antonelli, Terry, Stout & Kraus, LLP.

[57] ABSTRACT

A discrimination method of speckle noises in an ultrasonic tomography apparatus, includes a step of scanning a predetermined area of an object to be examined by an ultrasonic wave and receiving an ultrasonic echo signal from the object, a step of producing a digital echo signal on the basis of the ultrasonic echo signal to store it in a memory unit, a step of reading out the echo signals of a plurality of fields obtained by a plurality of continuous scanning operations from the memory unit, a step of statistically processing the echo signals at the same pixel position of the plurality of fields to obtain a judgment value and a step of comparing the judgment value with a predetermined reference value to decide in accordance with the compared result whether the echo signals of the statistically processed pixel contain speckle noises or not. An ultrasonic tomography apparatus in which a predetermined area of an object to be examined is scanned with an ultrasonic wave by means of a probe to receive an ultrasonic echo signal from the object so that a tomographic image of the object is produced from the received ultrasonic echo signal, includes a signal processing unit for producing a digital echo signal on the basis of the ultrasonic echo signal and storing the digital echo signal.

9 Claims, 7 Drawing Sheets

METHOD FOR DISCRIMINATING SPECKLE NOISES FROM SIGNALS IN ULTRASONIC TOMOGRAPHY APPARATUS AND ULTRASONIC TOMOGRAPHY APPARATUS INCLUDING SPECKLE NOISE REMOVING CIRCUIT

BACKGROUND OF THE INVENTION

The present invention relates to a speckle noise discrimination method and an ultrasonic tomography apparatus including a judging and removing circuit of speckle noises having small bright points appearing at random due to interference of scattered waves generated at various phases by sufficiently smaller reflection bodies of tissues of a living body than a wavelength of an ultrasonic wave in the ultrasonic tomography apparatus which utilizes an ultrasonic wave to measure a tomographic image of any part in an object to be examined.

Generally, noises named speckle noises and having an irregular period are mixed into an ultrasonic image obtained by the ultrasonic tomography apparatus. It is considered that the speckle noises are small bright points appearing at random due to interference of scattered waves generated at various phases by sufficiently smaller reflection bodies of tissues of a living body than a wavelength of an ultrasonic wave. It is known that the speckle noises appear to be superposed on an original reflected echo signal over the whole area of the image of the brightness modulation mode. More particularly, for example, in an ultrasonic image of the heart, the speckle noises are superposed on a reflected echo signal of a structure such as a wall of the heart, so that the original signal is disturbed to deteriorate the image quality such as flicker of an image and the speckle noises also appear in an image of a part having no reflective body such as the true lumen so that the image quality thereof is deteriorated. In general, it is known that the pattern of the speckle noises is largely changed depending on the arrangement of minute scattered bodies distributed in a living body and the pattern of the speckle noises is also changed when tissues of the living body are moved. However, a degree, a direction and brightness of the change of the pattern are not uniform. It is confirmed that when a living body is being moved, the speckle noises are changed irregularly.

In view of the above circumstances, a conventional ultrasonic tomography apparatus uses a frame correlation processing circuit as shown in FIG. 10 to perform the adding and averaging process with secular weight, so that the speckle noises in a moving image are reduced. The frame correlation processing circuit serves to reduce the speckle noises by means of a method generally named the "frame correlation" or the "scan correlation". The frame correlation processing circuit includes, as shown in FIG. 10, an operation processing circuit 1 constituted by, for example, a weighted adder, a frame memory 2 having the function of recording data of an image of the brightness modulation mode, and a control circuit 3 for successively generating addresses of the frame memory 2 in synchronism with data of an ultrasonic image inputted to an input terminal D of the frame memory 2.

In the frame correlation processing circuit, the frame memory 2 outputs data recorded in the address selected by the control circuit 3, that is, data before one frame from an output terminal E. The output data from the output terminal E is supplied to an input terminal B of the operation processing circuit 1. Then, the operation processing circuit 1 correlates (adds and averages) data at the current time sent from an ultrasonic body unit not shown and supplied to an input terminal A with the data before one frame inputted to the input terminal B and produces the correlated result from an output terminal C. Thus, the output data from the output terminal C is sent to the input terminal D of the frame memory 2 as data at a new tense. After the data at the new tense is inputted to the frame memory 2, the control circuit 3 directs the frame memory to record the data in the same address as that of the last time.

The correlation process performed by the operation processing circuit 1 is now described. When a numerical value inputted to the input terminal A of the operation processing circuit 1 is expressed by a, a numerical value inputted to the input terminal B is expressed by b, and the operation result produced in the output terminal C is c, the weighted addition and average processing is, in most cases, performed by the correlation coefficient of X and Y having the following relation:

$$a \cdot X + b \cdot Y = c \quad (1)$$

where X<1 and Y<1 and there is the following relation:

$$X + Y = 1 \quad (2)$$

Generally, the correlation coefficient of X and Y is selected depending on a diagnostic part of the object to be examined and the magnitude of noises.

SUMMARY OF THE INVENTION

In the frame correlation processing circuit of the conventional ultrasonic tomography apparatus, however, the image data inputted to the input terminal B of the operation processing circuit 1 shown in FIG. 10 has been already processed at the tense occurred before one frame and accordingly the processed output from the output terminal C of the operation processing circuit 1 is influenced by the past frames for a long time. Further, the degree of the influence to the image data of a frame to be correlated or the correlated image data is greatly different depending on, for example, the brightness level. In other words, the correlated image data of the frame having a large brightness is influenced for a long time, while the image data of the frame having low brightness is merely influenced for a very short time. In such a situation, when the correlation processing is made among some frames, proper judgment is impossible. Accordingly, the effect of the correlation processing cannot be sufficiently estimated to cause uncertain factor and the stability of the image quality by removal of speckle noises is insufficient. Further, in the frame correlation processing circuit shown in FIG. 10, the data such as the brightness level of the original ultrasonic image is successively varied by the correlation process of the operation processing circuit 1, so that the filter processing cannot be performed in accordance with the brightness. Accordingly, the processing algorithm cannot be changed in accordance with the brightness information and the process of the simple weighted addition grade as described above is merely performed.

Accordingly, it is an object of the present invention to provide a speckle noise discrimination method in an ultrasonic tomography apparatus and a speckle noise judging and removing circuit in which speckle noises mixed into an ultrasonic image can be discriminated effectively from image signal and only the speckle noises can be removed to improve the image quality.

The discrimination method of speckle noises in the ultrasonic tomography apparatus according to the present invention comprises a step of scanning a predetermined area of an object to be examined by an ultrasonic wave and receiving an ultrasonic echo signal from the object, a step of producing a digital echo signal on the basis of the ultrasonic echo signal to store it in a memory unit, a step of reading out the echo signals of a plurality of fields obtained by a plurality of continuous scanning operations from the memory unit, a step of statistically processing the echo signals at the same pixel position of the plurality of fields to obtain a judgment value and a step of comparing the judgment value with a predetermined reference value to decide in accordance with the compared result whether the echo signals of the statistically processed pixel contain speckle noises or not.

Further, the ultrasonic tomography apparatus according to the present invention in which a predetermined area of an object to be examined is scanned with an ultrasonic wave by means of a probe to receive an ultrasonic echo signal from the object so that a tomographic image of the object is produced from the received ultrasonic echo signal, comprises a signal processing unit for producing a digital echo signal on the basis of the ultrasonic echo signal and storing the digital echo signal, a control unit for simultaneously reading out echo signals at the same pixel position of a plurality of fields obtained by a plurality of continuous scanning operations by means of the signal processing means, a calculation unit for statistically processing the echo signals at the same pixel positions of the plurality of fields to calculate a judgment value, a judgment unit for comparing the judgment value with a predetermined reference value and deciding in accordance with the compared result whether the echo signals of the statistically processed pixel contain speckle noises or not, and a noise removing unit for preventing the digital echo signals of the pixel judged as containing speckle noises to be used for production of the tomographic image.

The image data of a plurality of continuous frames are read out in parallel from a memory unit of an ultrasonic body unit of the ultrasonic tomography apparatus and are statistically processed so that whether the image data contain speckle noises or not can be judged. Particularly, in the statistical processing operation of the plurality of image data, average brightness and mean variance of data at the same address of the image data of the plurality of frames are calculated and a ratio of the average brightness and the mean variance is calculated to thereby be able to discriminate speckle noises from the ultrasonic image effectively.

As the statistical processing method, in addition to the calculation of the ratio of the average brightness and the mean variance, another method can be adopted.

DESCRIPTION OF THE PREFERRED EMBODIMENTS

Figure 1:
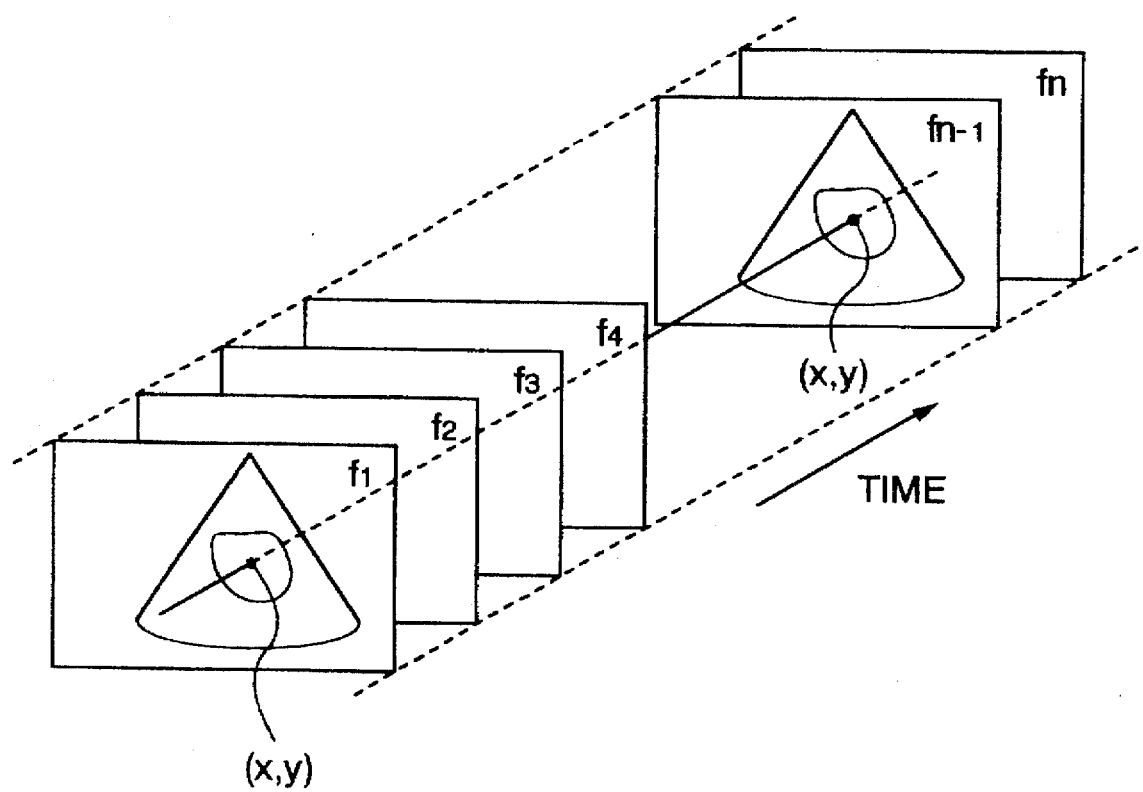
FIG. 1 is a diagram for explaining the principle of an embodiment of a speckle noise discrimination method according to the present invention.

Embodiments of the present invention are now described in detail with reference to the accompanying drawings. An ultrasonic tomography apparatus according to an embodiment of the present invention includes a probe unit 10 having a probe for transmitting and receiving an ultrasonic wave into and from an object to be examined and an ultrasonic transmitting and receiving unit for driving the probe to generate an ultrasonic wave and processing a received reflected echo signal, an ultrasonic body unit 11 for digitizing the reflected echo signal from the ultrasonic transmitting and receiving unit and including a memory unit in which data of an ultrasonic image in the object containing motor tissues are recorded as a plurality of frames in the time series manner, a speckle noise discrimination and removing circuit 14, a digital scanning converter 12 in which the digital signals from the memory unit are written for each scanning line of an ultrasonic beam to form image data, and an image display unit 13 for converting the image data from the digital scanning converter 12 into analog signals and displaying the signals as an image. The speckle noise discrimination method in the ultrasonic tomography apparatus includes reading the image data of the plurality of frames $f_1, f_2, \ldots, f_n$ continuing as shown in FIG. 1 from the memory unit of the ultrasonic body unit simultaneously in parallel, arranging the image data exactly in the time series manner in order of $f_1, f_2, \ldots, f_n$, then statistically processing the plurality of image data ($f_1$ to $f_n$) and judging whether the image data contain speckle noises or not.

Figure 2:
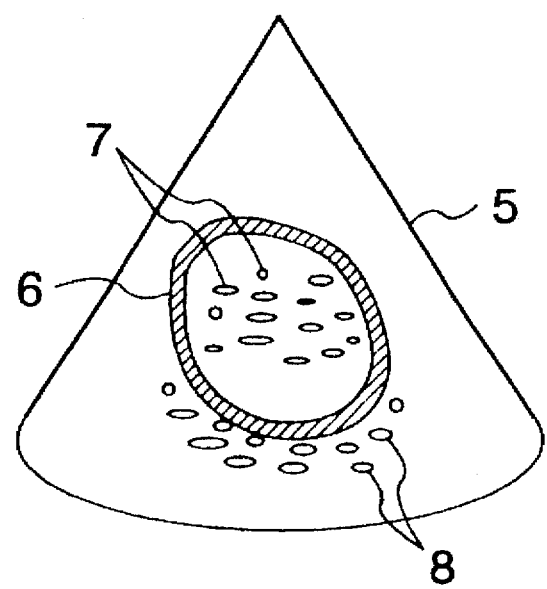
FIG. 2 is a diagram showing distributed speckle noises in an ultrasonic tomographic image collected for a diagnostic part in an object to be examined.

In this case, in a tomographic image 5 of the heart, for example, shown in FIG. 2, speckle noises 7 appearing in the cardiac coelom within the wall 6 of the heart have the brightness lower than that of tissues of the heart wall 6 or the like. Further, variation of the brightness level of the speckle noises 7 is irregular. The variation of the brightness versus time is shown by a graph of FIG. 3 having the abscissa expressing time (frame number) and the ordinate expressing the brightness. In other words, the tissues of the heart wall 6 or the like in motion have large uniform brightness as shown by curve $C_1$ while the speckle noises 7 have low scattered brightness as shown curve $C_2$. In FIG. 2, numeral 8 represents speckle noises appearing in tissues of the living body. The speckle noises 8 also have the same tendency as that of the curve $C_2$ of FIG. 3. As apparent from the graph of FIG. 3, the statistical method can be used to discriminate the speckle noises on the basis of the plurality (plural frames) of image data arranged in the time series manner.

In the statistical process of the plurality of image data, average brightness and mean variance of the data at the same address (x, y) of the image data in the plurality of frames $f_1$, $f_2, \ldots, f_n$ arranged exactly in the time series manner as shown in FIG. 1 are calculated and a ratio of the average brightness and the mean variance is calculated. In other words, the average brightness and the mean variance are calculated from the information content obtained by brightness-modulating the reflected echo signal at the same address (x, y), that is, at the same position of a field of vision of the tomographic image 5 of a predetermined number of frame memories as shown in FIG. 1 and the calculated values are utilized to calculate the ratio. When the average brightness and the mean variance for data at the same address (x, y) of n frames are P and Q, respectively, a judgment function S of speckle noises is given by $$S=P/Q \tag{3}$$

Whether the image data contains speckle noises or not can be determined depending on whether the judgment function S is larger than a predetermined reference value or not. That is, when the judgment function S is larger than the reference value, the image data is judged to be data for tissues of a stationary part and when the function S is equal to or smaller than the reference value, the image data is determined to contain speckle noises. In other words, when the average brightness P is small and the mean variance Q is large, the judgment function S is small, so that the image data can be determined to contain speckle noises. In this case, the fact that the mean variance Q is large means that data is varied irregularly as shown by curve $C_2$ of FIG. 3. The predetermined reference value for the judgment function S of the equation (3) may be selected for an object freely.

Figure 3:
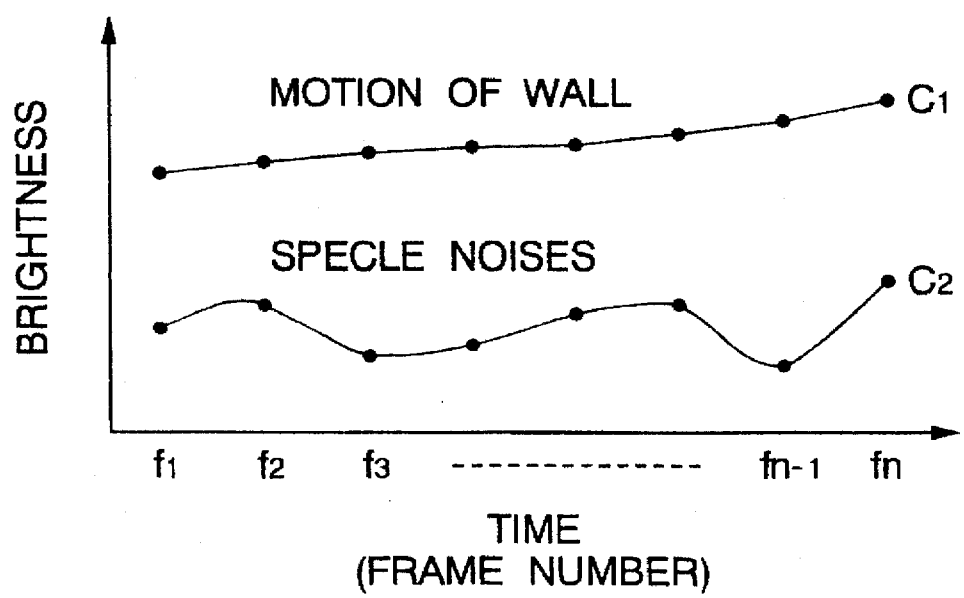
FIG. 3 is a graph showing varied brightness of the collected ultrasonic image with respect to time.

Further, in the graph showing the variation of the brightness versus time as shown in FIG. 3, when the brightness data from tissues in a living body maintaining the large brightness as shown by the curve $C_1$ is low in only a specific frame, it is determined that data is missing. Further, when the brightness data maintaining the brightness level of the speckle noises shown by curve $C_2$ of FIG. 3 suddenly rises in only a specific frame, it is judged that the data contains other noises. The data of the plurality of frames can be compared on the basis of the above conditions to judge whether the image data contains speckle noises or not.

Figure 4A:
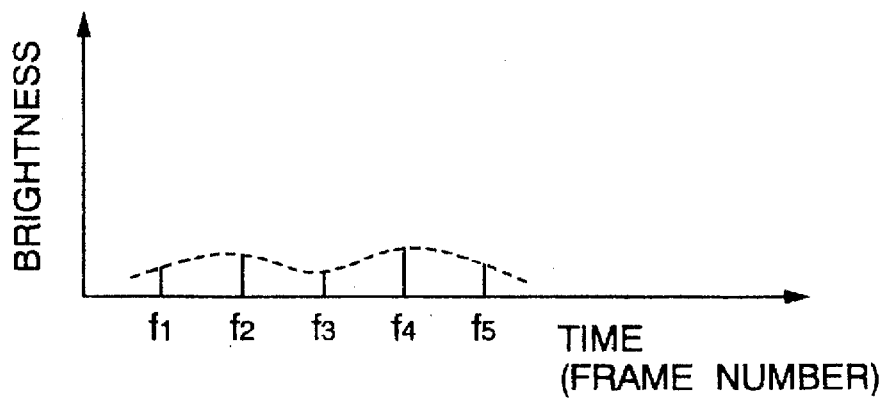
FIGS. 4A, 4B and 4C are graphs used in case where judgment as to whether speckle noises are contained or not is made by classifying data of a plurality of frames in accordance with the pattern of the graph.
Figure 4B:
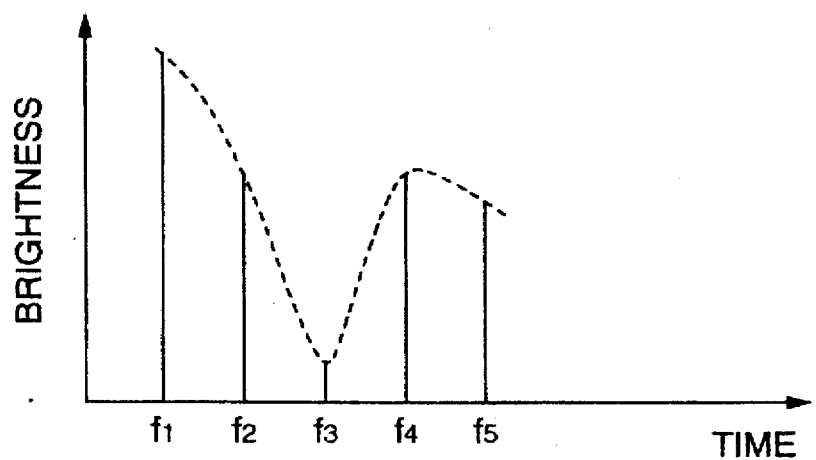
Figure 4C:
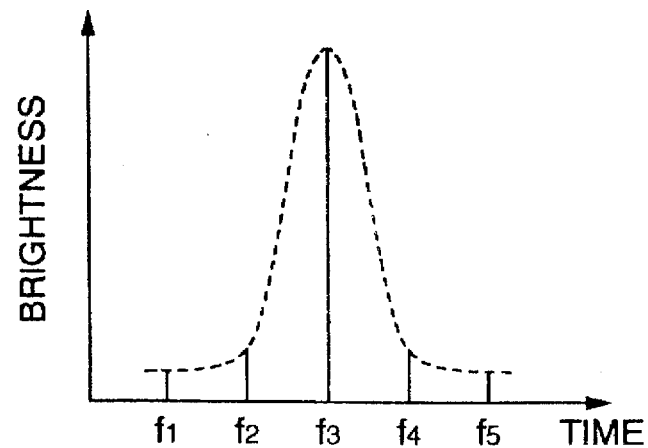

Judgment as to (A) speckle noises, (B) missing data and (C) other noises on the basis of the above judgment references is now described by classifying data of a plurality of frames in accordance with the patterns of graphs as shown in FIG. 4. FIGS. 4A, 4B and 4C show brightness data at the same address (x, y) of, for example, five frames $f_1$ to $f_5$ in the time series manner for the purpose of judgment of speckle noises. FIG. 4A shows a distribution of five data $f_1$ to $f_5$ being in the range of low brightness levels. Brightness values are at random and irregular. It can be judged that the pattern of the graph shown in FIG. 4A characterizes speckle noises 7 occurring in the coelom such as the inside of the heart wall 6 in which there is no reflective object. Next, FIG. 4B shows that only data of a specific frame, for example, a third frame $f_3$ contains speckle noises. It is judged that the data of FIG. 4B contains so-called black varnishing noises caused by fluctuation of a power supply circuit in view of the magnitude of the data of frames before and behind of the frame $f_3$. FIG. 4C shows that only data of a specific frame, for example, a third frame $f_3$ has large brightness and data of other frames have brightness level of speckle noises. It is judged that the data of FIG. 4C contains pepper noises due to an electric circuit or externally disturbed noises in view of the magnitude of the data of the third frame $f_3$. The graph patterns by the time series data shown in FIGS. 4A, 4B and 4C are obtained experimentally. Further, FIGS. 4A to 4C show the graph prepared by paying attention to one point of a field of vision of the ultrasonic image, while actually the whole field of vision of the obtained ultrasonic image is processed.

Figure 5:
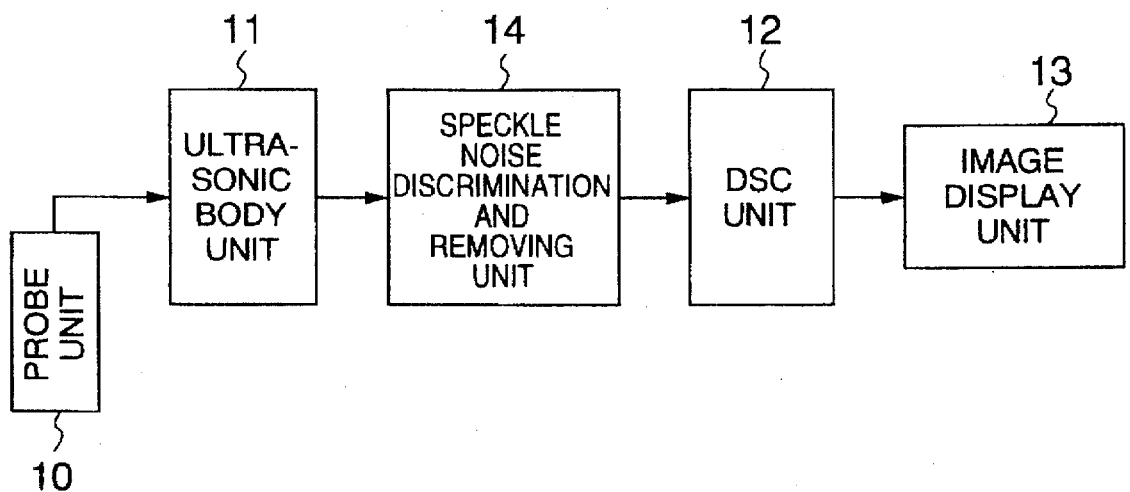
FIG. 5 is a block diagram showing the whole configuration of an embodiment of an ultrasonic tomography apparatus including a speckle noise discrimination and removing circuit according to the present invention.

Referring now to FIGS. 5 to 8, the ultrasonic tomography apparatus according to the embodiment of the present invention is described. FIG. 5 is a block diagram showing the whole configuration of the ultrasonic tomography apparatus including a speckle noise discrimination and removing circuit of the present invention. The ultrasonic tomography apparatus utilizes an ultrasonic wave to measure and display a tomographic image of a diagnostic part of an object to be examined and comprises a probe body 10, an ultrasonic body unit 11, a digital scanning converter unit (hereinafter referred to as a "DSC unit") 12, an image display unit 13 and a speckle noise discrimination and removing circuit 14.

The probe unit 10 serves to transmit and receive an ultrasonic wave into and from an object to be examined and includes an ultrasonic oscillating element not shown which constitutes a source for generating an ultrasonic wave and receives a reflected echo to convert the echo into an electric signal. The ultrasonic body unit 11 serves to drive the probe unit 10 to transmit and receive an ultrasonic wave and to record data of the obtained ultrasonic image and, although not shown, includes an ultrasonic transmitting and receiving unit for driving the probe unit 10 to generate an ultrasonic wave and for processing the received reflected echo signal, and a memory unit for digitizing the reflected echo signal from the ultrasonic transmitting and receiving unit and for recording data of ultrasonic images in an object to be examined including motor tissues into a plurality of frames in the time series manner. Further, the DSC unit 12 serves to write the digital signal from the memory unit for each scanning line of an ultrasonic beam to form image data and includes digital ultrasonic scanning line memories and a memory controller. The image display unit 13 serves to receive the image data produced from the DSC unit 12 and convert the image data into an analog signal to display the analog signal as an image and includes a digital-to-analog converter and a television monitor.

Figure 6:
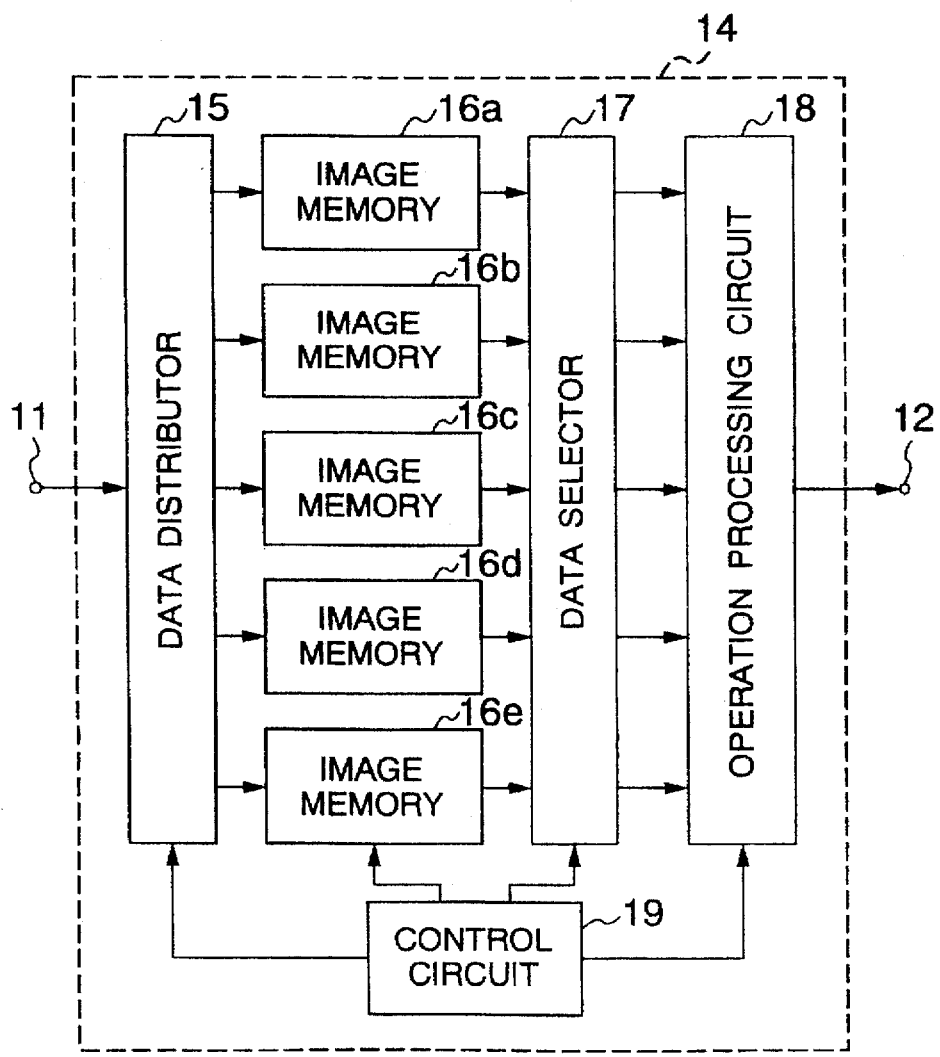
FIG. 6 is a block diagram showing an internal configuration of the speckle noise discrimination and removing circuit.

In the present invention, the speckle noise discrimination and removing circuit 14 is provided between the ultrasonic body unit 11 and the DSC unit 12. The speckle noise judging and removing circuit 14 serves to judge whether the image data contains speckle noises or not and remove the data when the data is judged to contain speckle noises and includes, as shown in FIG. 6, a data distributor 15, a plurality of image memories 16a to 16e, a data selector 17, an operation processing circuit 18, and a control circuit 19.

The data distributor 15 serves to receive image data produced from the ultrasonic body unit 11 and switch the plurality of image memories 16a to 16e for each frame under control of the control circuit 19 to send the image data to the switched image memories. The plurality of image memories 16a to 16e successively receives the image data of the plurality of consecutive frames distributed by the data distributor 15 to store the data therein and in FIG. 6, for example, five image memories are provided in parallel. The image memories are not limited to five and any number of image memories may be provided in accordance with a purpose and accuracy of processing or the like. The data selector 17 serves to receives the image data read out from the plurality of image memories 16a to 16e and rearrange the image data in order of an old data to a new data in the time series manner under control of the control circuit 19 to produce the rearranged image data. The operation processing circuit 18 serves to receive the image data of the plurality of frames rearranged exactly in the time series manner by the data selector 17 and statistically process the image data to thereby judge whether the image data to be judged contains speckle noises or not so that the speckle noises are removed. The speckle noise discrimination and removing circuit 14 sends the processed image data to the DSC unit 12. The control circuit 19 serves to control operation of the above constituent elements.

In the speckle noise discrimination and removing circuit 14 thus structured, the image data recorded in the plurality of image memories 16a to 16e are periodically updated. The control circuit 19 controls writing of data so that newest data are always recorded in the designated image memory. At this time, the addresses of the plurality of image memories 16a to 16e are all common and data at the same address appear at outputs thereof upon recording. In other words, upon recording of data into the image memories 16a to 16e, data at the same address of new and old frames are outputted simultaneously and supplied to the data selector 17. However, it is not understood which one of data stored in the plurality of image memories 16a to 16e is newest if it is not designated by the control circuit 19. Thus, the data selector 17 rearranges the data in order of an old data to a new data in the time series manner in response to the designation of the control circuit 19 and sends the rearranged data to the operation processing circuit 18. Assuming the data selector 17 has a data length of, for example, 6 bits, the data selector is required to have the capability of selecting data of 6 bits×5 or 30 bits. Accordingly, in the embodiment of FIG. 6, data selection can be attained by six matrix switches of 5×5. The operation processing circuit 18 receives the rearranged data sent from the data selector 17 and compares the image data of the plurality of frames arranged exactly in the time series manner to perform the statistical process. In this case, differently from the conventional method, the number of set frames, that is, data in the range of tense can be used for operation processing such as correlation exactly to judge whether the image data contains speckle noises or not so that the speckle noises can be removed. In FIG. 6, it is not always necessary to provide the data selector 17.

Figure 7:
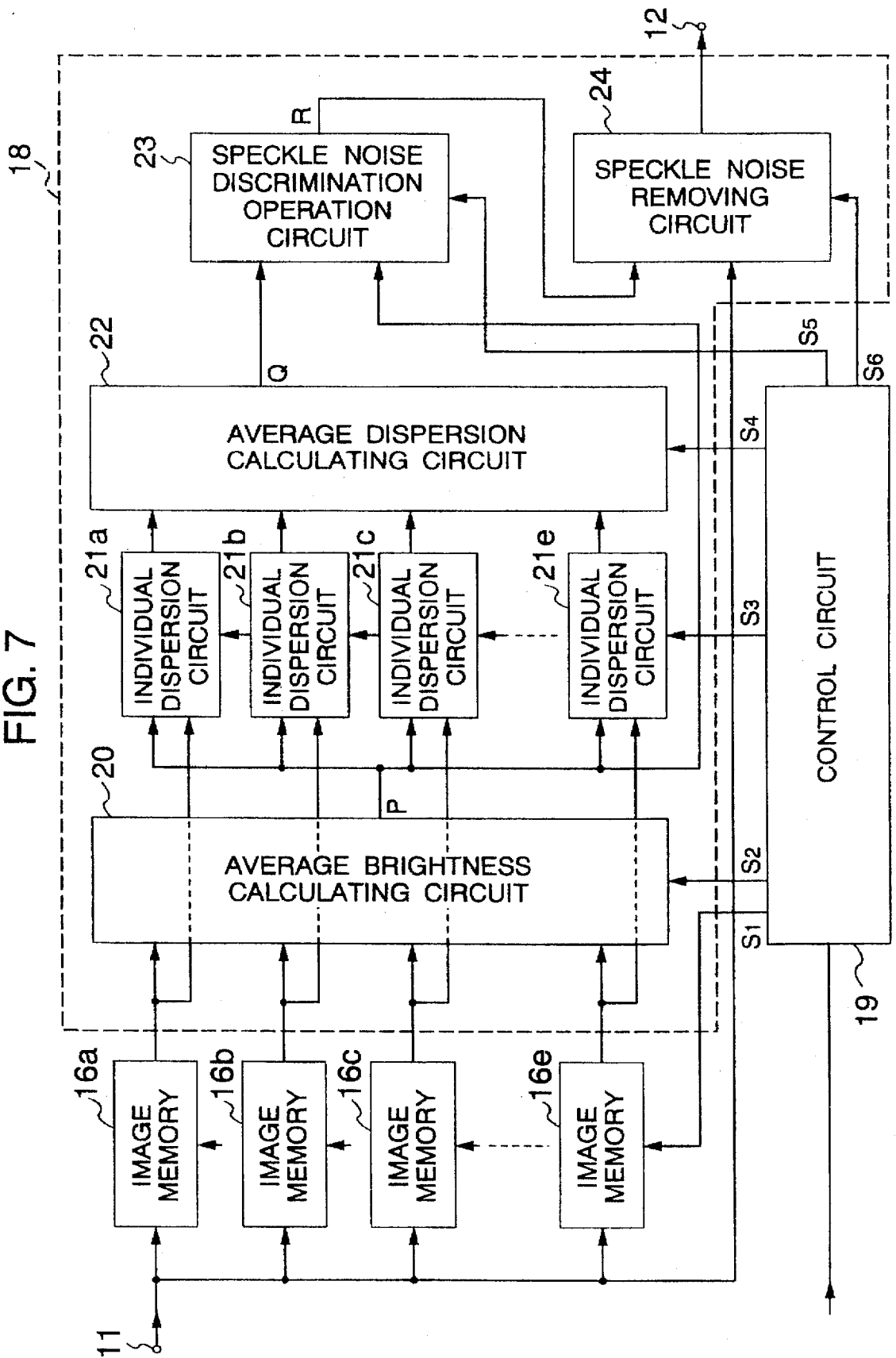
FIG. 7 is a block diagram showing an example of a definite internal configuration of an operation processing circuit in the speckle noise discrimination and removing circuit.

FIG. 7 is a block diagram showing a definite internal configuration of the operation processing circuit 18. In this embodiment, the function of the data distributor 15 shown in FIG. 6 is assumed to be executed by the control circuit 19 and the data distributor 15 is omitted. The operation processing circuit 18 includes an average brightness calculating circuit 20, a plurality of individual dispersion circuits 21a to 21e, a mean variance calculating circuit 22, a speckle noise discrimination operation circuit 23 and a speckle noise removing circuit 24.

The average brightness calculating circuit 20 calculates average brightness P (refer to the above equation (3)) of data at the same address of the image data of a plurality of frames read out from a plurality of, for example five, image memories 16a to 16e and arranged in the time series manner. The individual dispersion circuits 21a to 21e receive the average brightness P calculated by the average brightness calculating circuit 20 and image data read out from the image memories 16a to 16e and calculate absolute values of differences therebetween to obtain individual dispersion values. There are provided, for example, five individual dispersion circuits corresponding to the number of image memories 16a to 16e. The mean variance calculating circuit 22 receives individual dispersion values produced by the individual dispersion circuits 21a to 21e and calculates an average value of all the individual dispersion values to thereby calculate mean variance Q (refer to the above equation (3)) of the data at the same address of the image data of the plurality of frames arranged in the time series manner. Further, the speckle noise discrimination operation circuit 23 receives the calculated results obtained by the average brightness calculating circuit 20 and the mean variance calculating circuit 22 and calculates a ratio S (refer to the above equation (3)) of the average brightness P and the mean variance Q to judge whether the image data to be judged contain speckle noises or not. The speckle noise removing circuit 24 receives the judged result R of the speckle noise judgment operation circuit 23 to remove speckle noises from the image data at the current time inputted from the ultrasonic body unit 11. The output data from the speckle noise removing circuit 24 is sent to the DSC unit 12.

Figure 8:
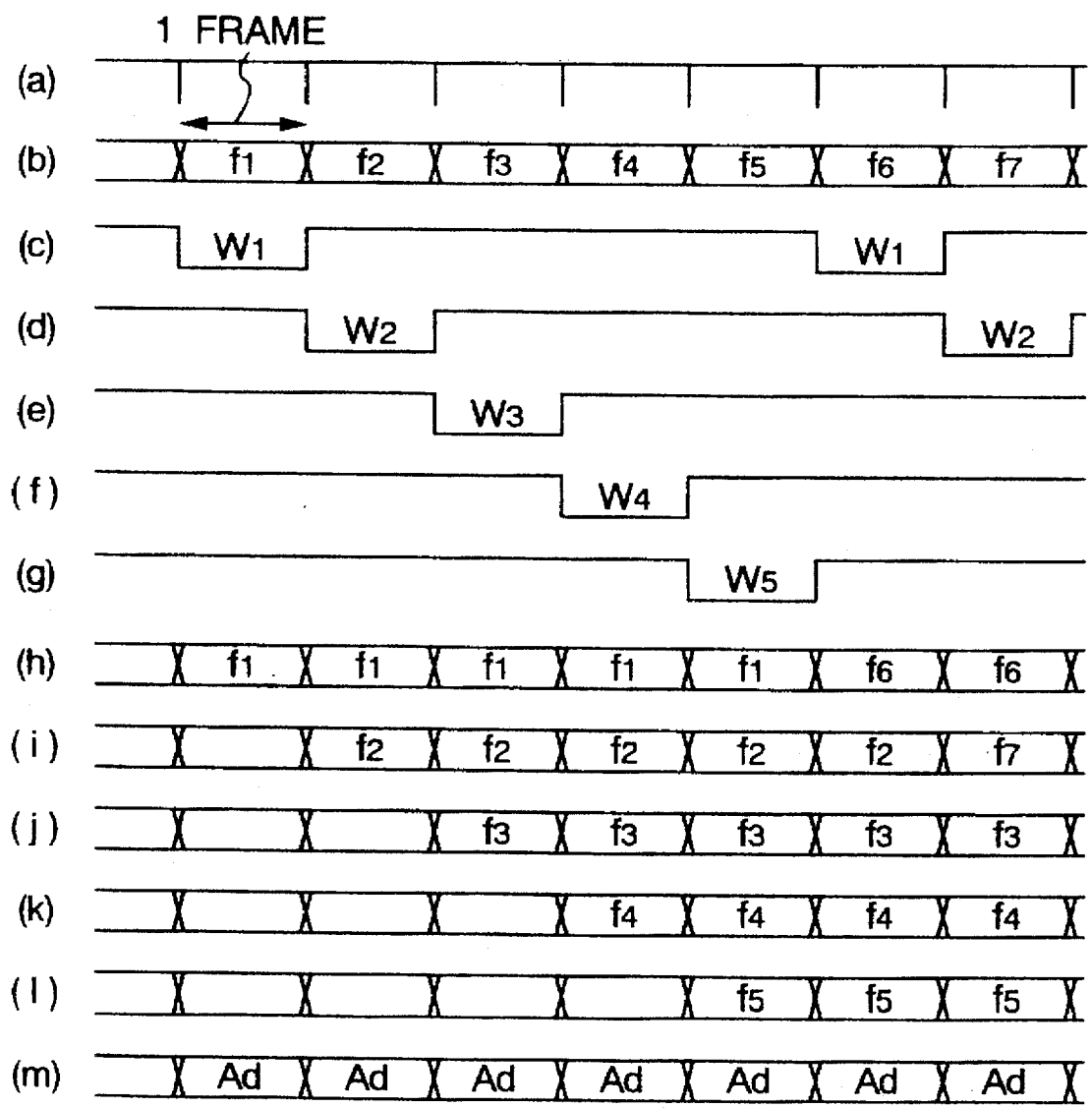
FIG. 8 is a timing diagram for explaining operation of the operation processing circuit.

Operation of the operation processing circuit 18 thus structured is now described with reference to the timing chart shown in FIG. 8. FIG. 8(a) shows a timing of a frame update signal for the five image memories 16a to 16e shown in FIG. 7, and the frame update signal is produced at the beginning of rewriting of the frame. FIG. 8(b) shows frame data of the image memories 16a to 16e, and the frame data include five frames of data of, for example, 8 bits. In FIG. 8, $f_1, f_2, f_3, \ldots$ represent frame numbers. FIG. 8(c) shows a write allowable signal $W_1$ inputted to the first image memory 16a. FIG. 8(d) shows a write allowable signal $W_2$ inputted to the second image memory 16b, FIG. 8(e) shows a write allowable signal $W_3$ inputted to the third image memory 16c, $\ldots$, FIG. 8(g) shows a write allowable signal $W_5$ inputted to the fifth image memory 16e. The write allowable signals $W_1$ to $W_5$ are contained in a memory control signal $S_1$ sent from the control circuit 19 shown in FIG. 7 to the image memories 16a to 16e. As apparent from FIGS. 8(a) to (g), data are written into the image memories 16a to 16e for each frame in the time series manner. In this case, the image memories 16a to 16e are provided for five frames, for example, and are allowed to be written every five frames.

Data read from the image memories 16a to 16e are processed as follows. First, as shown in FIG. 8(h), during five frames after data of the frame number $f_1$ are written in the first image memory 16a, the data $f_1$ are continuously outputted. Similarly, as shown in FIG. 8(i), during five frames after data of the frame number $f_2$ are written in the second image memory 16b, the data $f_2$ are continuously outputted. As shown in FIG. 8(j), during five frames after data of the frame number $f_3$ are written in the third image memory 16c, the data $f_3$ are continuously outputted. ... As shown in FIG. 8(l), during five frames after data of the frame number $f_5$ are written in the fifth image memory 16e, the data $f_5$ are continuously outputted. FIG. 8(m) shows address signals for the image memories 16a to 16e. The address signals are common to each frame and data represented by reference mark Ad are repeated in each frame. The address signal Ad is also contained in the memory control signal $S_1$ shown in FIG. 7.

When attention is paid to the time that the frame data of FIG. 8(b) are $f_5$, it is understood that the frame data $f_1$ to $f_5$ are all present as the outputs of the image memories 16a to 16e shown in FIGS. 8(h) to (l). The data $f_1$ to $f_5$ are sent to the average brightness calculating circuit 20 from the image memories 16a to 16e shown in FIG. 7 at the same time. At this time, the control circuit 19 supplies a control signal $S_2$ to the average brightness calculating circuit to control the timing of an adding and averaging circuit contained within the average brightness calculating circuit. Thus, the average brightness calculating circuit 20 calculates the average brightness P each time data from the image memories 16a to 16e are inputted to the average brightness calculating circuit 20. The individual dispersion circuits 21a to 21e receive the data from the image memories 16a to 16e and the average brightness P from the average brightness calculating circuit 20 each time the data are produced from the image memories 16a to 16e and calculate differences therebetween to calculate absolute values thereof. Then, the mean variance calculating circuit 22 adds and averages the individual dispersion values from the individual dispersion circuits 21a to 21e each time the individual dispersion values are inputted from the individual dispersion circuits 21a to 21e and calculates the mean variance Q. At this time, the control circuit 19 supplies a control signal $S_3$ to the individual dispersion circuits and a control signal $S_4$ to the mean variance calculating circuit to control the timing of the respective internal circuits.

In FIG. 7, each time the speckle noise judgment operation circuit 23 receives the average brightness P from the average brightness calculating circuit 20 and the mean variance Q from the mean variance calculating circuit 22, the speckle noise judgment operation circuit 23 calculates the ratio thereof in accordance with the equation (3) (S=P/Q) and judges whether the image data contains speckle noises or not depending on whether the judgment function S is larger than the predetermined value or not. Thereafter, the speckle noise removing circuit 24 receives the judged result R from the speckle noise discrimination operation circuit 23 and performs the image processing for removal of speckle noises in the image data at the current time inputted from the ultrasonic body unit 11. At this time, the control circuit 19 supplies control signals $S_5$ and $S_6$ to the speckle noise discrimination operation circuit and the speckle noise removing circuit, respectively, and controls the timing of the respective internal circuits. In FIGS. 7 and 8, five image memories are provided to perform data processing for five frames, while the present invention is not limited thereto and for example eight image memories may be provided to perform data processing for eight frames.

Figure 9:
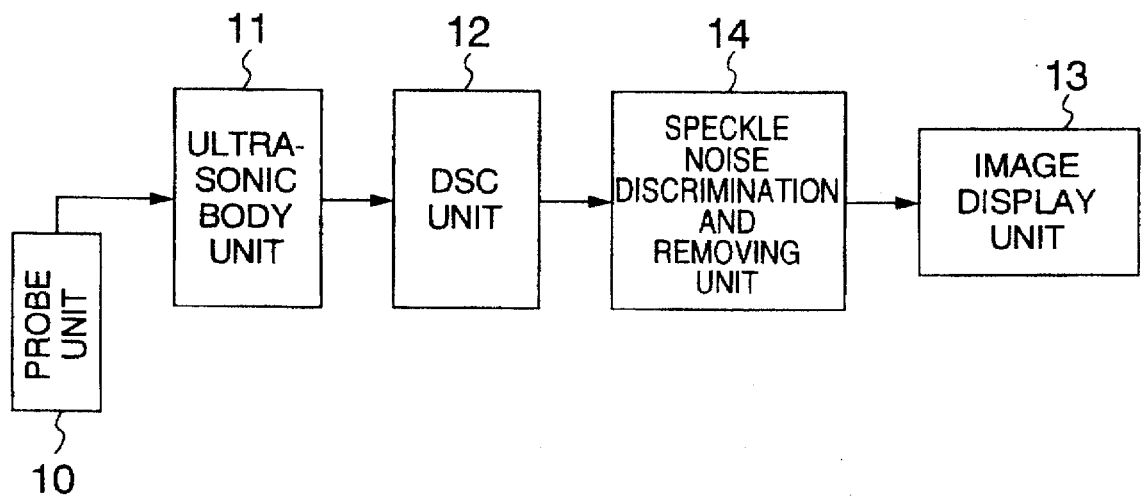
FIG. 9 is a block diagram of the whole configuration showing another embodiment of an ultrasonic tomography apparatus according to the present invention.
Figure 10:
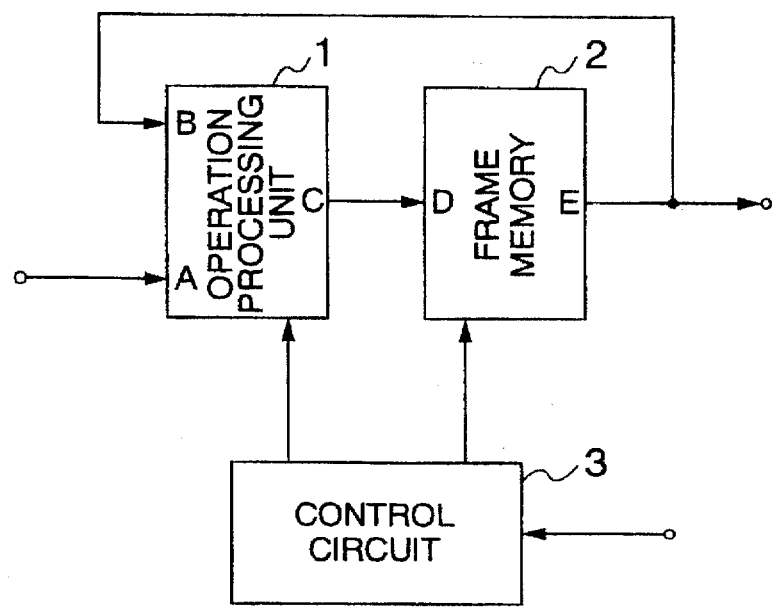
FIG. 10 is a block diagram showing a frame correlation processing circuit for removing speckle noises in a conventional ultrasonic tomography apparatus.

FIG. 9 is a block diagram of the whole configuration showing another arrangement example of the speckle noise discrimination and removing circuit 14 in the ultrasonic tomography apparatus of the present invention. In the arrangement example, the speckle noise discrimination and removing circuit 14 is provided between the DSC unit 12 and the image display unit 13. In the arrangement example of FIG. 5, the speckle noise discrimination and removing circuit 14 is provided between the ultrasonic body unit 11 and the DSC unit 12 and the data obtained from the ultrasonic body unit 11 is subjected to the operation processing in synchronism with the transmission and reception timing of the ultrasonic signal, whereas in the arrangement example of FIG. 9 the data completed as a frame image outputted from the DSC unit 12, that is, the image data scanned and converted to be displayed in a television monitor or the like is subjected to the operation processing in synchronism with the timing for display of the image display unit 13. In this case, in the internal configuration of the speckle noise discrimination and removing circuit 14 shown in FIG. 6, the writing and reading timing of the plurality of image memories 16a to 16e follows to the timing after scanning and conversion, that is, the display timing of the television monitor of the image display unit 13. Further, the image data of the plurality of image memories 16a to 16e are used as the frame image for display of the image display unit 13.

In the speckle noise discrimination method according to the embodiment of the present invention, the image data of the plurality of continuous frames are read out in parallel from the memory unit of the ultrasonic body unit of the ultrasonic tomography apparatus and are subjected to the statistical processing so that whether the image data contain speckle noises or not can be determined. Particularly, in the statistical processing of the plurality of image data, the average brightness and the mean variance of data at the same address of the image data of the plurality of frames are calculated and the radio of the average brightness and the mean variance is calculated, so that speckle noises can be discriminated from the ultrasonic image effectively.

The ultrasonic tomography apparatus according to the embodiment of the present invention includes the plurality of parallel image memories in which the image data of the plurality of continuous frames outputted from the ultrasonic body unit or the digital scanning converter unit are successively written, the operation processing circuit for receiving the plurality of image data read out from the image memories and statistically processing the image data to determine whether the image data contain speckle noises or not and remove the speckle noises, the control circuit for controlling operation of the image memories and the operation processing circuit, and the speckle noise discrimination and removing circuit for sending the processed image data from the operation processing circuit to the digital scanning converter unit or the image display unit, whereby only the speckle noises mixed into the ultrasonic image can be removed to thereby improve the image quality and increase the stability of the image quality.

Further, when the operation processing circuit of the speckle noise discrimination and removing circuit includes the average brightness calculating circuit for calculating the average brightness of data at the same address of the image data of the plurality of frames read out from the image memories, the mean variance calculating circuit for calculating the mean variance of the data at the same address of the image data of the plurality of frames, the speckle noise discrimination operation circuit for receiving the calculated results obtained by the respective circuits and calculating the ratio of the average brightness and the mean variance to judge whether the image data contain speckle noises or not, and the speckle noise removing circuit for receiving the judged result and removing speckle noises in the image data from the ultrasonic body unit or the digital scanning converter unit, the speckle noise discrimination and removing circuit can be realized in a small size and at a low cost even if 8 image memories and 8 frames are used to statistically process 8-bit data.

What is claimed is:

1. A discrimination method for speckle noises in an ultrasonic tomography apparatus, comprising the steps of:

scanning a predetermined area of an object to be examined by an ultrasonic wave and receiving an ultrasonic echo signal from the object;

producing a digital echo signal on the basis of said ultrasonic echo signal to store it in a memory unit;

reading out the echo signals of a plurality of fields obtained by a plurality of continuous scanning operations from said memory unit;

statistically processing the echo signals at the same pixel position of said plurality of fields to obtain a judgment value; and comparing said judgment value with a predetermined reference value to decide in accordance with the compared result whether the echo signals of the statistically processed pixel contain speckle noises or not.

2. A discrimination method according to claim 1, wherein said statistical processing step comprises calculating average brightness and mean variance of the pixel from the echo signals at the same pixel position of said plurality of fields and calculating a value corresponding to a ratio of said average brightness and said mean variance as said judgment value.

3. A discrimination method according to claim 2, wherein when said average brightness is P and said mean variance is Q, the judgment value S is calculated by S=P/Q and it is decided that the echo signal from the pixel having the judgment value S smaller than said reference value contains speckle noises.

4. An ultrasonic tomography apparatus in which a predetermined area of an object to be examined is scanned with an ultrasonic wave by means of a probe to receive an ultrasonic echo signal from the object so that a tomographic image of the object is produced from the received ultrasonic echo signal, comprising:

signal processing means for producing a digital echo signal on the basis of said ultrasonic echo signal and storing said digital echo signal;

control means for simultaneously reading out echo signals at the same pixel position of a plurality of fields obtained by a plurality of continuous scanning operations by means of said signal processing means;

calculation means for statistically processing said echo signals at the same pixel position of said plurality of fields to calculate a judgment value;

discrimination means for comparing said judgment value with a predetermined reference value and deciding in accordance with the compared result whether said echo signals of said statistically processed pixel contain speckle noises or not; and noise removing means for preventing the digital echo signals of the pixel containing discriminated speckle noises being used for production of said tomographic image.

5. An ultrasonic tomography apparatus according to claim 4, wherein said calculation means includes an average brightness calculating circuit for calculating average brightness of the pixel from the echo signals at the same pixel position of said plurality of fields, a mean variance calculating circuit for calculating mean variance of the pixel from the echo signals at the same pixel position of said plurality of fields, and a judgment value calculating circuit for calculating a value corresponding to a ratio of said average brightness and said mean variance as said judgment value.

6. An ultrasonic tomography apparatus according to claim 5, wherein when said average brightness is P and said mean variance is Q, the judgement value S is calculated by S=P/Q and said judgment means decides that the echo signal from the pixel having said judgment value S smaller than said reference value contain speckle noises.

7. An ultrasonic tomography apparatus according to claim 6, further comprising a digital scanning converter including a memory unit in which the digital echo signals are written in order of inputting of the digital echo signals and from which said written digital echo signals are read out in order different from the writing order.

8. An ultrasonic tomography apparatus according to claim 7, wherein said digital scanning converter receives the digital echo signals from said noise removing means.

9. An ultrasonic tomography apparatus according to claim 7, wherein said digital scanning converter is included in said signal processing means.

* * * * *